Patented Dec. 19, 1933

1,940,417

UNITED STATES PATENT OFFICE 1,940,417

BITUMINOUS PAVEMENT

Alfred S. Hirzel, Wilmington, Del.

No Drawing. Application February 18, 1931
Serial No. 516,834

4 Claims. (Cl. 94—23)

My invention relates to the surface course of a bituminous or water-proof pavement and has to do particularly with a construction whereby its surface is rendered less slippery.

The surface course of an asphalt pavement usually consists of a mineral aggregate combined with a bituminous binder, the particles of the mineral aggregate being of smaller size than those of the lower courses of the pavement. An aggregate very commonly used for such surface course is one all of which passes a ⅝-inch screen and from 15-45% of which passes a ¼-inch screen. Such a top course, especially when composed of limestone or stone of similar fracture, tends, under traffic, to become quite slippery by reason of the smoothing or polishing effect of traffic upon the exposed faces of the particles of stone. I have discovered that this slipperiness may be lessened or avoided by the substitution of small particles of crushed slag in place of the small particles of stone which pass the ¼-inch screen. To accomplish the desired result the crushed slag should constitute 10% or more of the total aggregate. This substitution of slag for stone in this part of the aggregate not only tends to render the pavement less slippery, but also betters the pavement because particles of slag have a different fracture and more extensive surface than those of stone, and absorb more of the asphalt or bituminous binder and thereby give the surface mixture a higher percentage of asphalt.

In practicing my invention I take ground slag running in size from that which passes a ¼-inch screen to dust. From a stone aggregate passing the ⅝-inch screen which is to be used as the aggregate for the surface course of the pavement, I remove all material which passes the ¼-inch screen, constituting not less than 10% of the total aggregate, and replace this material thus removed by similar amount of the finely crushed slag, with the result that the aggregate used has the desired grading, and also possesses by reason of the composition of its finer end the capacity to much reduce the slipperiness of the resulting pavement.

While I have instanced the application of my invention to an aggregate all of which passes a ⅝-inch screen, it is not thus limited in scope. The surface course of a pavement may contain stones much larger than ⅝-inch or the maximum size may be smaller, or it may be all sand, but in either case my invention may be employed by removing the finer portion of the aggregate by means of a screen approximating that size which will remove from the total aggregate somewhat less than one-half of it, but more than 10% of it, and substituting therefor a similar range of sizes of crushed slag.

I believe the advantageous results of this substitution are derived from the gritty and granular structure of particles of slag by reason of which as the surface of a small particle wears away it does not rub smooth, but instead little pieces of grit are continually broken off leaving exposed a fractured and therefore roughened surface which affords excellent traction. This sort of action seems to occur principally in the finer particles which approximate sand or dust. Therefore my invention broadly consists of the substitution in the surface course of a pavement of slag for stone in its finer portion only.

Having thus described my invention, I claim:

1. A bituminous pavement having an upper or wearing course, comprising a bituminous binder and a mineral aggregate consisting of stone and slag, the larger particles being stone and the smaller particles constituting less than 50% and more than 10% of the aggregate, being crushed slag.

2. A wearing surface for a bituminous pavement composed of aggregate and binder, the aggregate consisting of small stones combined with grit and sand derived from crushed slag, said grit and sand thus derived comprising more than 10% of the total aggregate.

3. A wearing course for a bituminous pavement formed of a bituminous binder and stone particles running from ⅝-inch to ¼-inch sizes and crushed slag particles running from ¼-inch size to dust, and constituting from 10% to 50% of the total mineral particles.

4. The method of preparing a wearing surface for a bituminous pavement which consists of selecting a stone aggregate running from ⅝-inch to dust, removing therefrom all particles passing a ¼-inch screen and substituting therefor particles similar in gradation and size derived from crushed slag, and constituting more than 10% of the total aggregate, mixing together the stone and slag aggregate thus selected and adding a bituminous binder and laying the mix on the surface of the pavement.

ALFRED S. HIRZEL.